United States Patent [19]

Morrone

[11] Patent Number: 4,736,102
[45] Date of Patent: Apr. 5, 1988

[54] READING DEVICE FOR STIMULABLE PHOSPHOR PANEL

[75] Inventor: Luciano Morrone, Carcare, Italy

[73] Assignee: Minnesota Mining and Manufacturing Company, St. Paul, Minn.

[21] Appl. No.: 887,120

[22] Filed: Jul. 17, 1986

[30] Foreign Application Priority Data

Jul. 29, 1985 [IT] Italy ............... 21752 A/85

[51] Int. Cl.$^4$ ................................. G03C 5/16
[52] U.S. Cl. ...................... 250/327.2; 250/484.1
[58] Field of Search ............ 250/327.2, 484.1, 228

[56] References Cited

U.S. PATENT DOCUMENTS

| | | | |
|---|---|---|---|
| 1,897,219 | 2/1933 | Schroter | 250/228 |
| 3,674,974 | 7/1972 | Costello | 350/618 |
| 3,859,527 | 1/1975 | Luckey | 250/327.2 |
| 4,258,264 | 3/1981 | Kotera et al. | 250/484 |
| 4,341,993 | 7/1982 | Brunsting et al. | 250/458.1 |
| 4,346,295 | 8/1982 | Tanaka et al. | 250/327.2 |
| 4,453,180 | 6/1984 | Juergensen | 250/228 |
| 4,629,890 | 12/1986 | Goto et al. | 250/327.2 |

*Primary Examiner*—Carolyn E. Fields
*Attorney, Agent, or Firm*—Donald M. Sell; James A. Smith; Mark A. Litman

[57] ABSTRACT

An elliptical section mirror is placed with its concave side turned towards the surface of a stimulable phosphor panel to detect and deflect towards the second of its focal segments the light emitted by the phosphor after the scanning thereof with a stimulating ray passing through an opening of the mirror. The panel, the emitting surface and the emitting depth of the panel passes through the first focal segment of the mirror and the stimulating radiation impinges upon the panel, preferably in a perpendicular direction, along said first focal segment. A light guide having a straight-line inlet end placed in the second focal segment of the mirror is impinged upon by the light coming from the first focal segment and transfers it towards a photodetector through an outlet end.

8 Claims, 2 Drawing Sheets

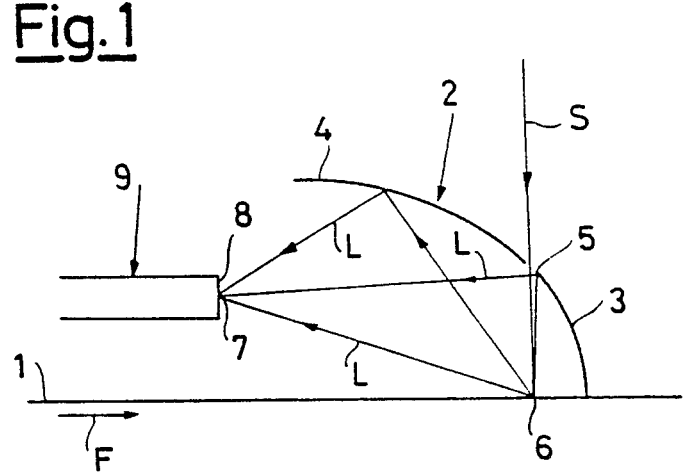

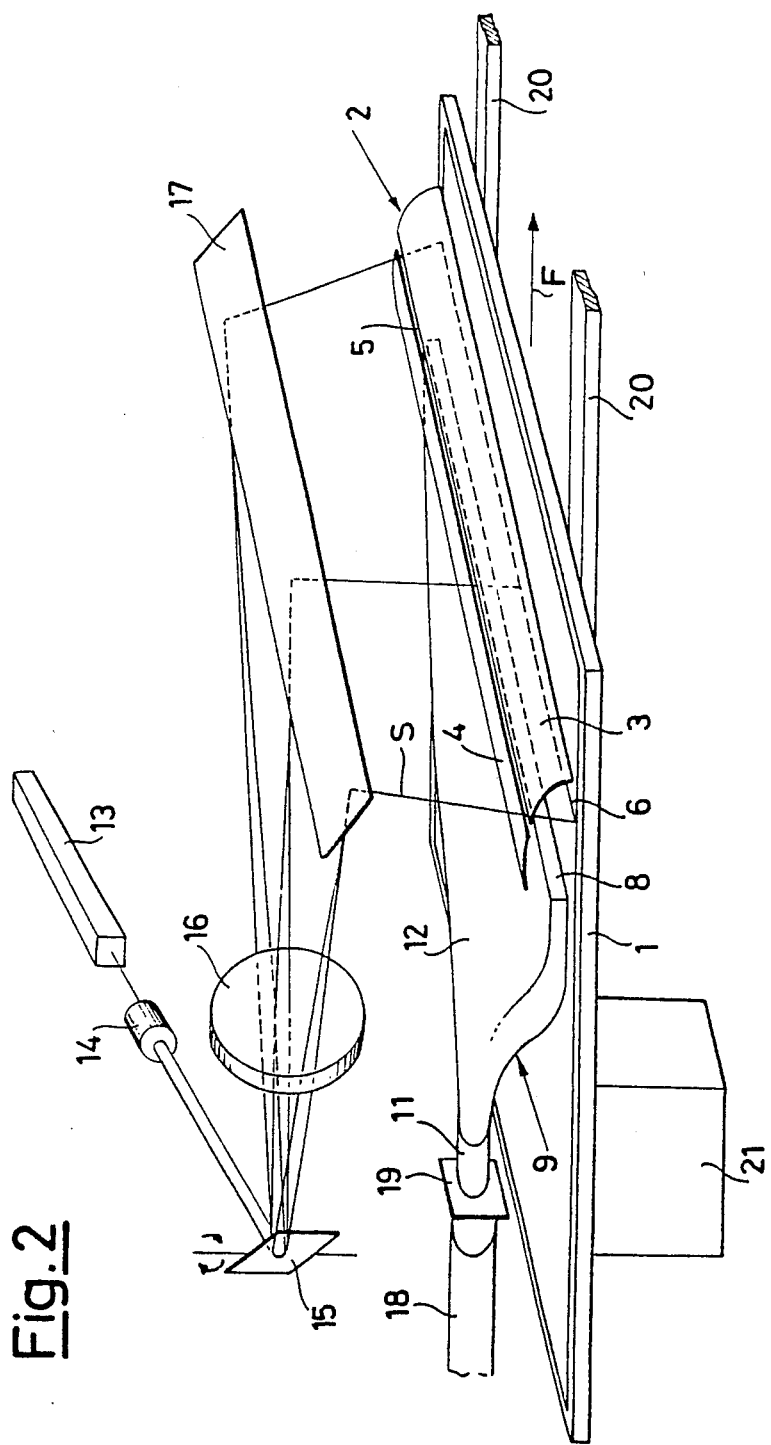

READING DEVICE FOR STIMULABLE PHOSPHOR PANEL

DESCRIPTION

The present invention refers to a reading device for stimulable phosphor panels, in particular for use in digital radiography.

The principle of using a stimulable phosphor panel for temporarily storing radiation is known. Such radiation is then recovered by scanning the same phosphor panel with a stimulating radiation (e.g. a laser source) capable of causing the emission of visible light which reproduces the stored radiation image. Suitable means convey said light towards a photodetector, the output of which is used to display the recorded image. Such a system is described with details in U.S. Pat. No. 3,859,527.

When used in radiology, the system, by storing the image, requires a brief exposure of the patient to the x-rays.

A problem encountered in reading the stimulable phosphor is that of the detection of the light emitted by the phosphor, which must be efficient to avoid undesirable losses of information and accurate to assure the highest signal-to-noise ratio.

One solution of the problem is reported in U.S. Pat. No. 3,859,527 and is based on the use of a flat semitransparent mirror turned 45 degrees with respect to the stimulating ray direction (which is perpendicular to the scanned surface) to let pass the impinging stimulating ray and deflect in a perpendicular direction towards a photodetector the light beams emitted in the opposite direction by the phosphor surface.

This known solution however is disadvantageous from the point of view of the quantity and quality of the detected signal. This is due to the fact that the light beams emitted by the phosphor are so much deflected that only a slight portion thereof actually reaches the photodetector, which in addition contains some portions of the stimulating radiation somehow reaching the photodetector itself. Under such conditions, since it is not possible to greatly increase the radiation to which the patient is exposed, the signal-to-noise ratio is unavoidably reduced and it is difficult to use the obtained information for diagnostic purposes.

Some improvement is obtained with another solution known from U.S. Pat. No. 4,258,264. To improve the signal-to-noise ratio, the light beams emitted by the phosphor have a wavelength different from that of the stimulating ray. In this way, possible portions of stimulating radiations can be shut out by means of a suitable filter before they reach the photodetector, which merely detects the light beams emitted by the phosphor. An increase of the signal-to-noise ratio and therefore a better "readability" of the displayed information are thus obtained. There is still however the problem of the light beams dispersion, which under the same stored radiation intensity causes a lower efficiency of the radiation and therefore an information loss.

A further push towards the solution of the problem is given by U.S. Pat. No. 4,346,295, wherein the means conveying the light emitted by the phosphor struck by the stimulating ray is a light guide consisting of a transparent sheet progressively wrapped from a straight-line inlet portion near the scan line of the stimulating ray to an anular outlet portion associated with the inlet (normally having a circular shape) of a photodetector. A partial ellipse shaped mirror can be arranged near the scan line at the opposite part, with respect to the stimulating ray, of the light guide in such position as to let pass the incident stimulating radiation and deflect towards the straight-line end of the light guide the light rays emitted by the phosphor in a direction different from that suitable for the direct detection by the light guide.

The combined use of the light guide and mirror allows the detection of the highest portion of the emitted light, while the stimulating radiation, no longer having to pass through a semitransparent mirror but directly striking the phosphor panel, can in no way be deflected such that portions thereof impinge the light guide and therefore the photodetector. In this way both efficiency and signal-to-noise ratio are very high.

Even this last solution has however some drawbacks. In particular, the straight-line portion of the light guide must be as near as possible to the scan line, so as to detect the highest portion of the emitted light. This causes construction complications directly connected with the efficiency of the emitted light detection.

One aspect of the present invention is that of realizing a reading device for a stimulable phosphor panel, which shall further improve the reading efficiency of stimulable phosphors with a better efficiency with respect to a simpler construction.

According to the present invention such an improvement is achieved by means of a device for reading the image stored in a stimulable phosphor panel, which comprises means for positioning the panel, means for emitting the stimulating radiation, means for scanning the panel with stimulating radiation, means for detecting the light emitted by the panel and transferring it to a photodetector and reflecting means for directing the light emitted by the panel towards detecting means, characterized by the fact that the reflecting means consists of an elliptical section mirror having its concave portion turned towards the panel and an opening on the surface of said mirror for the passage of the stimulating radiations, that an emitting portion of the panel passes through the first of the focal segments of the mirror and the detecting means consists of a light guide having a straight-line inlet end placed on the second focal segment of the mirror (the term "panel", when used in reference to the location of the first focal segment of the mirror, is intended to refer to any and all portions of the phosphor containing areas within the panel, each portion of the panel including the emitting surface and the emitting depth thereof). The stimulating radiation, coming from the emitting means placed outside the ellipse, passes through the mirror to hit the panel along its first focal segment and the emitted light hits the light guide in the second focal segment of the mirror.

While scanning the panel with the stimulating radiation, the panel is preferably slid mechanically (e.g. on motor-driven guides) in the longitudinal direction and the stimulating radiation source is translated in the transversal direction. Other relative movements between panel and stimulating radiation source can however be adopted to collect the stored image.

Useful stimulable phosphors according to the present invention are those known in the art, e.g. those described in U.S. Pat. Nos. 4,236,078; 4,239,968; 4,261,854, in European patent No. 29,963, which upon stimulation emit light of any wavelength.

The preferred stimulating radiations used to stimulate the phosphor after having exposed it to the image-forming radiations (such as x-rays, alpha-rays, beta-rays, gamma-rays and UV rays) are laser beams. In the case of phosphors which upon stimulation emit light of a wavelength ranging from 300 to 500 nm, laser beams having a wavelength ranging from 500 to 800 nm, preferably from 600 to 700 nm, are preferred, such as for instance a He-Ne laser (633 nm) or a Kr laser (647 nm).

The stimulated radiations are directed onto the stimulable phosphor panel in a direction substantially perpendicular to the panel surface; slight inclination from the perpendicular direction can be used, but they are not preferred in the present invention.

The means for transmitting the light emitted by the phosphor to the photodetector, according to the present invention indicated as light guides, comprise all those means suitable for collecting light in one end thereof and transferring it without substantial losses to the other end for a proper association with the photodetector. Useful light guides are for instance those described in U.S. Pat. No. 4,346,295 which consist of thermoplastic synthetic resin sheets (such as acrylic resins, polyvinyl resins, polycarbonates, polyesters, polyepoxydes) or glass transparent to the light emitted by the phosphor and having a smooth surface to allow the total reflection of light inside them.

Other useful light guides are fiber optic beams. Such light guides are shaped to have a substantial straight-line inlet end to receive the light emitted by the scanning line of the panel and an outlet end shaped to assure the best association with the photodetector; the latter generally has a circular section and for this reason the light guide outlet end is preferably shaped to cover as much of the photodetector region as possible.

In the case of the thermoplastic synthetic resin or glass sheet, this is wrapped on at the outlet end to provide an anular shape.

In the case of fiber optics, these are arranged linearly at the inlet end and are collected together at the outlet end into a circular section suitable to cover the photodetector surface. The outlet end may anyhow have a section different from the anular or circular one, although it is less preferred for efficiency of light transmission to the photodetector surface.

The light guides consisting of fiber optics beams are more preferred than those consisting of plastic sheets or glass. The former in fact do not require foldings or wrappings which affect the light transmission efficiency, but require a mere progressive circular-shape assemblage of the fiber optics formerly arranged linearly. Therefore, there is no particular problem involving any definite width/length ratio of the fiber optics. There is only the need (even if not so critical as described in U.S. Pat. No. 4,346,295 for the plastic sheet or glass light guides) of reducing the length for reasons of cost or dimensions, but not of efficiency of light transmission.

The reflecting means suitable to receive the light emitted by the panel and direct it towards the light guide, according to the present invention, consists of an elliptical section mirror. The focal point set deriving from the elliptical sections of the mirror define the two focal segments of the invention. The emitting portion of the stimulable phosphor panel passes through the first of these focal segments, while the straight-line inlet end of the light guide is placed on the second focal segment. The concave part of the mirror is turned towards the panel surface and is provided with a thin opening, on the surface of the mirror and parallel to the focal segment, through which the stimulating radiations pass during the scanning step. The width of this opening is so small to allow the passage of the stimulation beam without substantially affecting the efficiency of the light collection. The panel plane passing through the focal segment and the plane passing through both focal segments form such an angle as to allow the light guide to be housed on the second focal segment and for construction reasons such an angle is preferred to be as small as possible.

The useful portion of the elliptical section mirror extending towards the focal segment, on which the straight-line inlet end of the light guide is placed, is determined by the acceptance angle of the light guide which depends upon the material and the way the guide is manufactured. In fact, the light reflected by the mirror and impinging onto the light guide at an angle wider than such acceptance angle does not contribute to the light collection.

The effectiveness of the device of the present invention has been evaluated in terms of light detection efficiency (as a ratio between the photons detected by the fiber optics in the acceptance angle and the photons emitted by the panel) of the light guide with reference to the eccentricity (ratio between shorter and longer axis) of the elliptical section mirror. Under consideration of a limit of 30 degrees for the acceptance angle of the fiber optics (fiber optics having wider acceptance angles, e.g. 45 degrees, are known), efficiency values ranging from about 10% for elliptical section mirrors with an eccentricity of 0.9 to about 40% for elliptical section mirrors with an eccentricity of 0.1 were obtained. Said calculated values were confirmed experimentally with mirrors having different eccentricities. In practice, it is difficult to make mirrors having a low eccentricity value (i.e. a very oblate elliptical section) without defects which may interfere with the regular reflection of light. A useful compromise between the eccentricity obtainable in the practice and percentage of light detection was obtained with mirrors having an eccentricity ranging from 0.8 to 0.4, which assure percentages of light detection ranging from about 15 to 35% (in the case of a light acceptance angle by the fiber optics equal to 30 degrees).

The characteristics and advantages of the present invention will be much more evidenced in the following detailed description of a possible practical embodiment illustrated as an example in the enclosed drawings, wherein:

FIG. 1 is a section view of the principle scheme of the device according to the present invention;

FIG. 2 shows a specific example of practical realization of the device according to the present invention.

With reference to FIG. 1, number 1 indicates a per se known type of stimulable phosphor panel containing a stored radiation used for instance for a patient for radiographic purposes. Panel 1 is progressively moved in the direction of arrow F by moving means of any known type.

On the stimulable phosphor panel 1 there is placed an elliptical mirror 2, on which surface an opening (5) is made. This opening has such dimensions as to allow the passage of the laser beam, which divides the mirror into the two portions 3 and 4. The opening is developed in a perpendicular direction with respect to the drawing plane. A stimulating ray S is let to pass through such opening and is subjected to an alternate movement in perpendicular direction with respect to the sheet plane to "read" the phosphor panel surface 1 along a scanning line 6 which gradually moves along the panel 1 because of the movement of the panel itself in the direction of arrow F and which represents one of the focal segments of the elliptical mirror.

In the other focal segment 7 of the elliptical mirror 2 there is arranged the inlet end 8 of a fiber optics beam 9, the other end of which, not shown in FIG. 1, is associated with the inlet of a photodetector (not shown) of a per se known type.

Deeper details of the reading device according to the present invention are shown in FIG. 2, where the three-dimensional structure of mirror 2 with its opening 5 and the fiber optics beam 9 can be seen. In such a figure, the stimulating radiation S is shown to be produced by a laser ray generator 13, followed by a ray widener 14 and a swinging mirror 15, which together with a flat lens 16 and a stationary mirror 17 gives the laser ray S a swinging movement along opening 5 and therefore along the scanning line 6. Transport guides for the panel 1 are finally shown under 20 and a panel driving motor under 21.

The described structure suggests the following working of the device according to the present invention. The incidence of the stimulating radiation S along the scanning line 6 causes the phosphor panel 1 to emit from one of the two focal segments 6 of the mirror variously divergent light rays L, which contain the information of the stored radiation. The elliptical mirror 2 reflects and condenses all L-rays onto the other focal segment 7 of the same mirror and then into the straight-line inlet end 8 of the fiber optics beam 9. The various fiber optics 10 convey the received light rays towards the circular outlet end 11 and then through filter 18 to the photodetector 19, which under proper processing produces an output electric signal suitable for making visible the radiation image stored by the phosphor 1.

Two realization and employment examples about the device of the present invention are reported hereinbelow as a better explanation of the preceding description.

EXAMPLE 1

A glass fiber optics beam, having an inlet thickness of 0.5 mm, an inlet wideness of 40 cm, a length of 155 cm, an outlet diameter of 1.5 cm and an acceptance angle of 30 degrees, was used together with a 18×20 cm stimulable phosphor panel made of a 98 micron thickness luminescent layer containing 228 g/sq.cm of a LaOBr-:Ce,Pr phosphor (having 0.2 g of Ce and 10 to the minus 4 power of Pr for 100 grams of phosphor) dispersed in a butyl polymethylmethacrylate and isobutyl polymethacrylate 1:1 by weight mixture, and with an elliptical mirror having a focal distance of 52.8 mm, the longest axis of 80 mm, a total length of 42 cm and an opening on its surface having a length of 40 cm and a width of 3.5 mm. The opening had been made such that the incidence point of the stimulating ray coincided with one of the two focal segments of the mirror, while the other focal segment coincided with the inlet end of the fiber optics beam. The stimulating ray was a 632.8 nm He-Ne laser beam having an outlet power of 30 mW. A MALLES GRIOT BG1 and a Bialkali/Q type THORN EMI 9635 QB photomultiplier for the spectral sensitivity were placed at the fiber optics beam outlet end. The light collection efficiency, considered as the percentage ratio between the light detected by the fiber optics in the acceptance angle and the light emitted by the panel, resulted to be equal to 18.5%, i.e. a high value if compared with those obtainable with the prior art systems.

The experiment was repeated excluding the elliptical mirror and bringing one or two fiber optics beam as near as possible to the scanning line. The light collection efficiency was measured. In the case of a single fiber optics beam such efficiency resulted to be 5.5%, 3.1% and 2.2% for distances of 1 mm, 2 mm and 3 mm, respectively, of the fiber optics beam from the scanning line. In the case of two fiber optics beams, it resulted to be 10.8%, 6.2% and 4.5% for distances of 1 mm, 2 mm and 3 mm, respectively, of every fiber optics beam from the scanning line.

EXAMPLE 2

The experiment of Example 1 was repeated by using an elliptical mirror having a focal distance of 69.2 mm and a longest axis of 80 mm. The light detection efficiency due to the combination of the elliptical mirror and the fiber optics resulted to be 29%.

I claim:

1. A device for reading a radiation image stored in a stimulable phosphor panel, which comprises means for positioning said panel, means for emitting stimulating radiation, means for scanning said panel by said stimulating radiation, means for detecting the light emitted by said panel and transferring it to a photodetector and reflecting means for directing the light emitted by said panel towards said detecting means, characterized by the fact that:
   (a) said reflecting means consists of an elliptical section mirror having two focal segments having its concave side turned towards said panel and an opening on its surface for the passage of said stimulating radiation;
   (b) said panel passes through the first of the focal segments of said mirror; and
   (c) said detecting means comprising a light guide having a straight-line inlet end placed on the second focal segment of said mirror,
   said stimulating radiation, coming from said emitting means placed outside the ellipse, passing through the mirror through said opening to impinge upon the panel along the first focal segment thereof and the emitted light impinging upon said light guide in the second focal segment thereof.

2. The device of claim 1, characterized by the fact that the stimulate phosphor panel is shifted longitudinally and the stimulating radiation source is shifted transversely to the purpose of the panel scanning.

3. The device of claim 1, characterized by the fact that the stimulating radiation is directed perpendicularly to the panel surface.

4. The device of claim 1, characterized by the fact that the eccentricity of the elliptical section mirror is comprised in the range from 0.9 to 0.1.

5. The device of claim 1, characterized by the fact that the light guide is provided with a substantially circular outlet end associated with the photodetector.

6. The device of claim 1, characterized by the fact that the light guide consists of a fiber optic array.

7. The device of claim 1, characterized by the fact that the elliptical section mirror is extended towards the second focal segment to such a length as to direct the light emitted by the first focal segment under an angle as least as wide as the light guide acceptance angle.

8. The device of claim 1, characterized by the fact that said stimulating radiation is a laser beam.

* * * * *